United States Patent
Kosugi

(10) Patent No.: US 9,485,669 B2
(45) Date of Patent: Nov. 1, 2016

(54) DISPLAYING RADIO-WAVE CONDITION

(71) Applicant: LENOVO (Singapore) PTE, LTD., New Tech Park (SG)

(72) Inventor: Kazuhiro Kosugi, Sagamihara (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 86 days.

(21) Appl. No.: 14/179,368

(22) Filed: Feb. 12, 2014

(65) Prior Publication Data

US 2014/0226512 A1  Aug. 14, 2014

(30) Foreign Application Priority Data

Feb. 13, 2013  (JP) .................................. 2013-025979

(51) Int. Cl.
*H04W 24/00* (2009.01)
*H04W 88/02* (2009.01)
*H04B 17/00* (2015.01)
*H04W 48/20* (2009.01)

(52) U.S. Cl.
CPC ............. *H04W 24/00* (2013.01); *H04B 17/00* (2013.01); *H04W 48/20* (2013.01); *H04W 88/02* (2013.01)

(58) Field of Classification Search
None
See application file for complete search history.

(56) References Cited

U.S. PATENT DOCUMENTS

| 2010/0008258 | A1* | 1/2010 | Ji | H04W 8/26 370/254 |
| 2012/0188890 | A1* | 7/2012 | Tabata | H04B 17/23 370/252 |
| 2013/0339504 | A1* | 12/2013 | Montemurro | H04W 12/06 709/223 |

FOREIGN PATENT DOCUMENTS

JP  2005-033285  2/2005

* cited by examiner

*Primary Examiner* — Hassan Phillips
*Assistant Examiner* — Ayanah George
(74) *Attorney, Agent, or Firm* — Kunzler Law Group

(57) ABSTRACT

A wireless terminal accesses an access point using a shorter range wireless communication method. The access point performs communication with a wide-area radio communication network using a longer range wireless communication method, and may include a determination unit that determines whether a connected access point is a mobile access point or not; an acquisition unit that, when the determination unit determines that the connected access point is a mobile access point, acquires a radio-wave condition of communication with the wide-area radio communication network using the longer range communication method from the connected access point; and a display unit that displays the radio-wave condition acquired by the acquisition unit on a screen.

16 Claims, 7 Drawing Sheets

DISPLAYING RADIO-WAVE CONDITION

FIELD

The present invention relates to a wireless terminals and methods for displaying radio-wave conditions.

BACKGROUND

Mobile access points (or "mobile routers") are widely used recently, and are a portable type device for a wireless terminal apparatus connectable to a wireless local-area network (LAN), such as a laptop PC, a tablet PC, a smartphone and a mobile phone allowing a user to use a wide-area radio communication network (high-speed radio network). Exemplary mobile access points include a mobile 3G access point connectable to a 3G network, a mobile 4G/LTE access point connectable to a 4G/LTE network, and a mobile WiMAX access point connectable to WiMAX.

FIG. 7 describes the case where a Wifi terminal 100 connects to a 3G network 300 via a mobile 3G access point 200 that can be an access point of a Wifi terminal. Conventionally, the Wifi terminal 100 shows a radio-wave condition between the mobile 3G access point 200 and the Wifi terminal 100 on its screen.

This means that, even when the mobile 3G access point 200 is located outside a service area 301A of a base station 301 for the 3G network 300, and if the Wifi terminal 100 is located within a service area 200A of the mobile 3G access point 200, then the screen of the Wifi terminal 100 shows as if the radio-wave condition were good. In this way, in spite of the screen of the Wifi terminal 100 showing a good radio-wave condition, a user may fail to connect to the 3G network 300. In this case, the user has to perform a troublesome operation to check the radio-wave condition with the base station 301 on the screen of the mobile 3G access point 200.

A user typically has the mobile 3G access point 200 together with the Wifi terminal 100, and so the Wifi terminal 100 and the mobile 3G access point 200 are close to each other, meaning that the radio-wave condition between the Wifi terminal 100 and the mobile 3G access point 200 is typically in good radio-wave condition. That is, a radio-wave condition between the mobile 3G access point 200 and the base station 301 rather than the radio-wave condition between the Wifi terminal 100 and the mobile 3G access point 200 is important for a user.

SUMMARY

In order to overcome the aforementioned problems, a wireless terminal apparatus of the present invention accesses an access point using a shorter range (second) wireless communication method, the access point performing communication with a wide-area radio communication network using a longer range (first) wireless communication method. The wireless terminal apparatus includes: a determination unit that determines whether a connected access point is a mobile access point or not; an acquisition unit that, when the determination unit determines that the connected access point is a mobile access point, acquires a radio-wave condition of communication with the wide-area radio communication network using the first wireless communication method from the connected access point; and a display unit that displays a radio-wave condition acquired by the acquisition unit on a screen.

One embodiment of the present invention further includes a measurement unit that measures a radio-wave condition of communication with the access point using the second wireless communication method, and when the determination unit determines that the connected access point is not a mobile access point, the display unit displays a radio-wave condition measured by the measurement unit on the screen.

In another embodiment of the present invention, when the connected access point is a mobile access point, the acquisition unit further acquires information on battery remaining capacity of the access point, and the display unit displays, on the screen, the acquired information on battery remaining capacity of the access point.

A method and computer program product also perform the functions of the apparatus.

DETAILED DESCRIPTION

Figure 1:
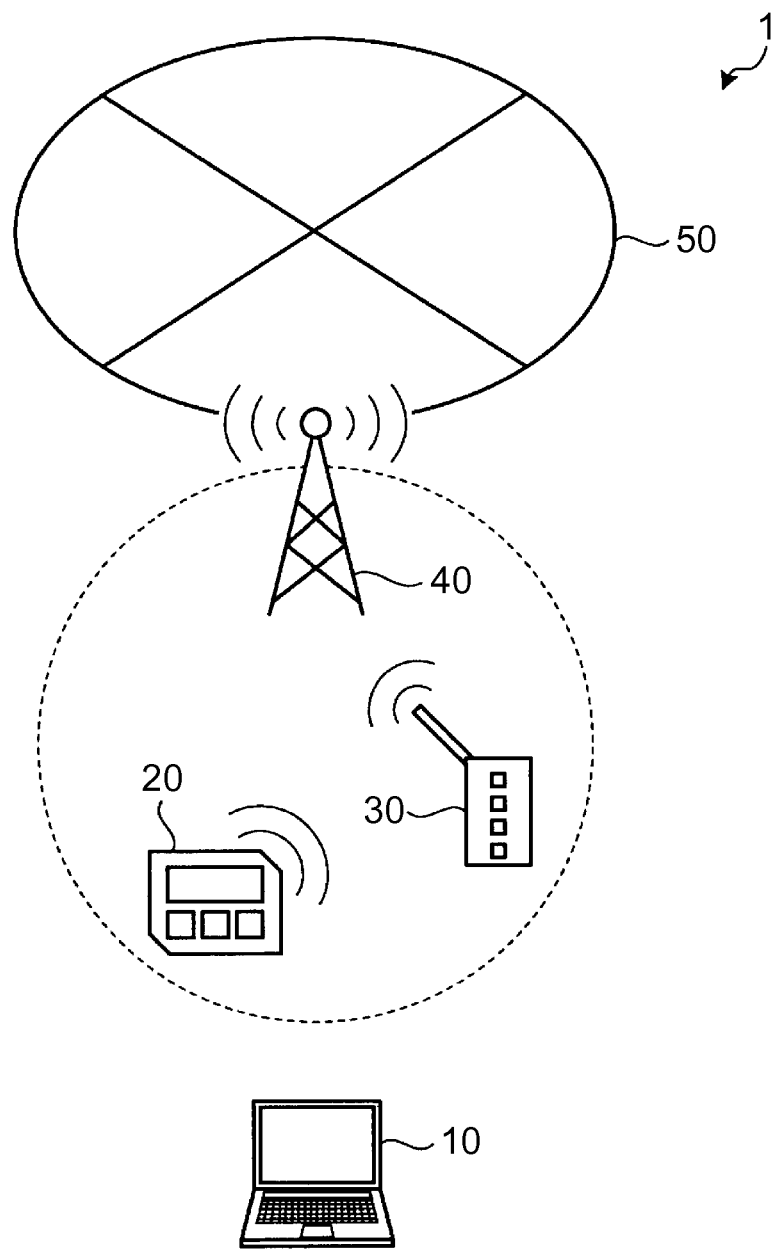
FIG. 1 shows an exemplary configuration of a wireless system according to one embodiment.

The following describes a wireless terminal apparatus, a method for displaying a radio-wave condition thereof, a radio-wave condition display system, and a computer-executable program according to the present invention, with reference to the drawings. It can be easily understood that the components of the present invention, which are generally shown in the drawings of the present specification, may have various configurations and may be designed to be in various ways of arrangement. Therefore, the following detailed descriptions on embodiments of an apparatus, a system and a method of the present invention are not intended to limit the scope of the present invention recited in the claims, but simply show selected embodiments of the apparatus, the system and the method of the present invention without contradictions to the present invention recited in the claims. A person skilled in the art would appreciate that the present invention can be implemented without one or more of the specific details or with another method, component or material. The following embodiments do not limit the present invention, but are only examples thereof.

Figure 2:
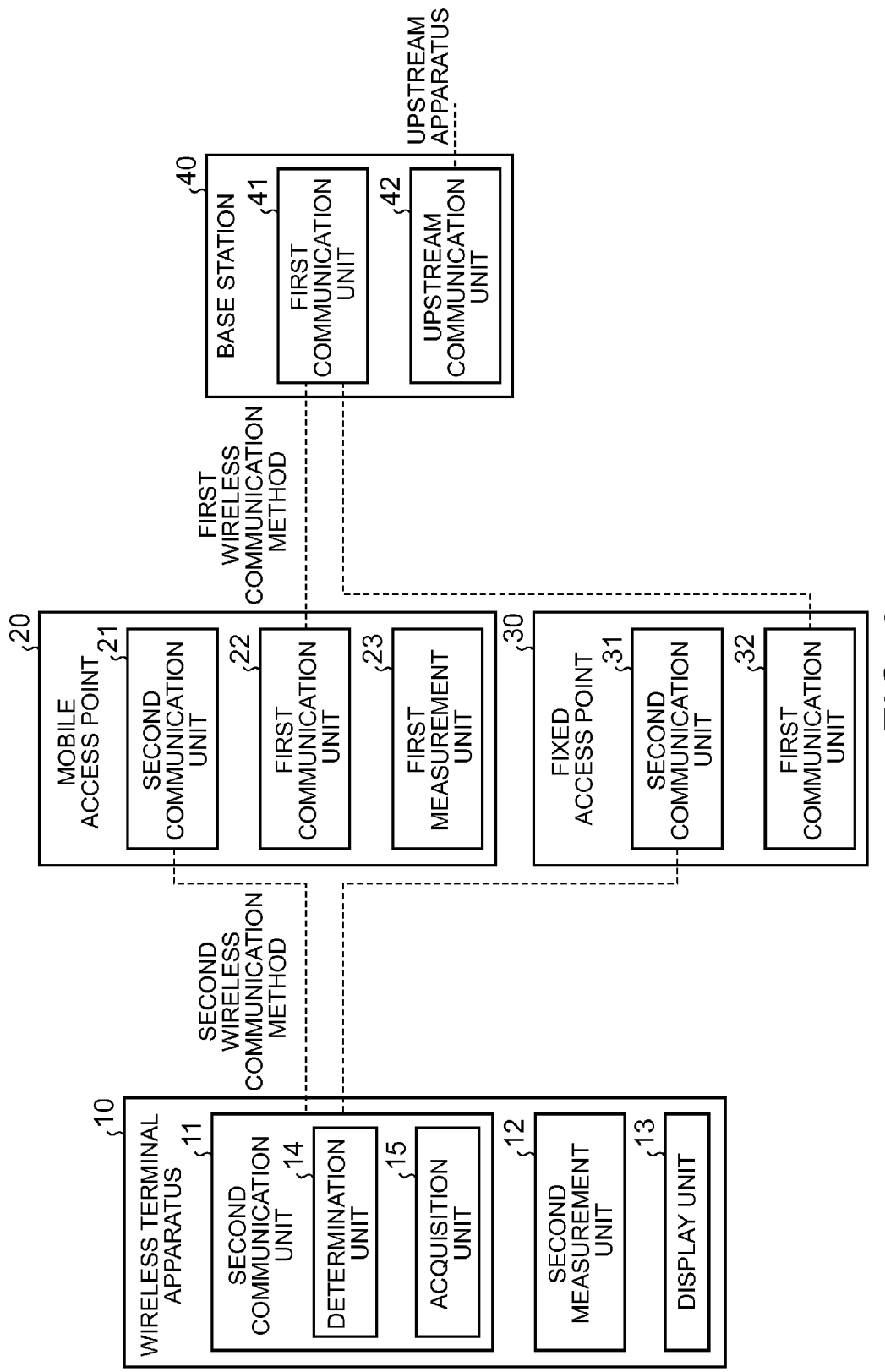
FIG. 2 schematically shows a functional configuration of a wireless terminal apparatus, a mobile access point, a fixed access point and a base station.

FIG. 1 shows an exemplary configuration of a wireless system according to the present embodiment. FIG. 2 schematically shows a functional configuration of a wireless terminal apparatus, a mobile access point, a fixed access point and a base station.

As shown in FIG. 1, a wireless system 1 includes a wireless terminal apparatus 10 that performs wireless communication with a mobile access point 20 or a fixed (normal non-mobile) access point 30 using a second wireless communication method, a mobile access point 20 that performs communication with the wireless terminal apparatus 10 using the second wireless communication method and performs communication with a base station 40 using a first wireless communication method, the fixed access point 30 that performs communication with the wireless terminal apparatus 10 using the second wireless communication method and performs communication with the base station 40 using the first wireless communication method, and the base station 40 for a wide-area radio communication network 50 that performs communication with the mobile access point 20, the fixed access point 30 and the like using the first wireless communication method.

Examples of the first wireless communication method include 3G, 4G/LTE, and WiMAX, and examples of the second wireless communication method include Wifi and Bluetooth®. Since these first and second wireless communication methods are known, their detailed descriptions are omitted.

The wireless terminal apparatus 10 determines whether the connected access point is a mobile access point or not, and when the access point is a mobile access point, the wireless terminal apparatus 10 acquires a radio-wave condition of the communication using the first wireless communication method between the mobile access point and the base station 40 (wide-area radio communication network 50) from the connected mobile access point, and displays the acquired radio-wave condition on the screen. The wireless terminal apparatus 10 may include a laptop PC, a tablet PC, a smartphone, a mobile phone or the like.

As shown in FIG. 2, the wireless terminal apparatus 10 has a function of performing communication using the second wireless communication method, for example, and includes a second communication unit 11 that performs communication with the mobile access point 20, the fixed access point 30 and the like using the second wireless communication method, a second measurement unit 12 that measures, by its own device, a radio-wave condition of the communication with the mobile access point 20 and the fixed access point 30 using the second wireless communication method, and a display unit 13 that displays a radio-wave condition or the like.

The second communication unit 11 includes a determination unit 14 that determines whether a connected access point is a mobile access point or not, and an acquisition unit 15 that acquires, when the connected access point is a mobile access point, a radio-wave condition of the communication between the mobile access point and the base station 40 using the first wireless communication method from the connected mobile access point at predetermined time intervals.

The wireless terminal apparatus 10 may include a combination of hardware and software, for example. For instance, a function of the second communication unit 11 to execute basic processing (connection, disconnection and the like) of the second wireless communication method may be implemented by the execution of an OS by a computer, and functions of the determination unit 14, the acquisition unit 15, the second measurement unit 12 and the display unit 13 may be implemented by the execution of an application program by a computer.

The mobile access point 20 functions as an access point of the wireless terminal apparatus 10, and is configured to be portable. The mobile access point 20 may include a dedicated mobile router, or a laptop PC, a tablet PC, a smartphone, a mobile phone or the like having a function as an access point (tethering function), for example.

As shown in FIG. 2, the mobile access point 20 includes a second communication unit 21 that receives an access using the second wireless communication method from the wireless terminal apparatus 10, a first communication unit 22 that performs communication with the base station 40 using the first wireless communication method to implement a function as a wireless access point, and a first measurement unit 23 that measures, by its own device, a radio-wave condition of the communication with the base station 40 using the second wireless communication method at predetermined time intervals.

The fixed access point 30 functions as an access point of the wireless terminal apparatus 10, and is typically placed at a shop, a building, a public institution and the like. As shown in FIG. 2, the fixed access point 30 includes a second communication unit 31 that receives an access using the second wireless communication method from the wireless terminal apparatus 10, and a first communication unit 32 that performs communication with the base station 40 using the second wireless communication method to implement a function as a wireless access point.

The base station 40 includes a first communication unit 41 that performs communication with the mobile access point 20, the fixed access point 30 and the like using the second wireless communication method and an upstream communication unit 42 that performs communication with an upstream apparatus of the wide-area radio communication network 50.

Figure 3:
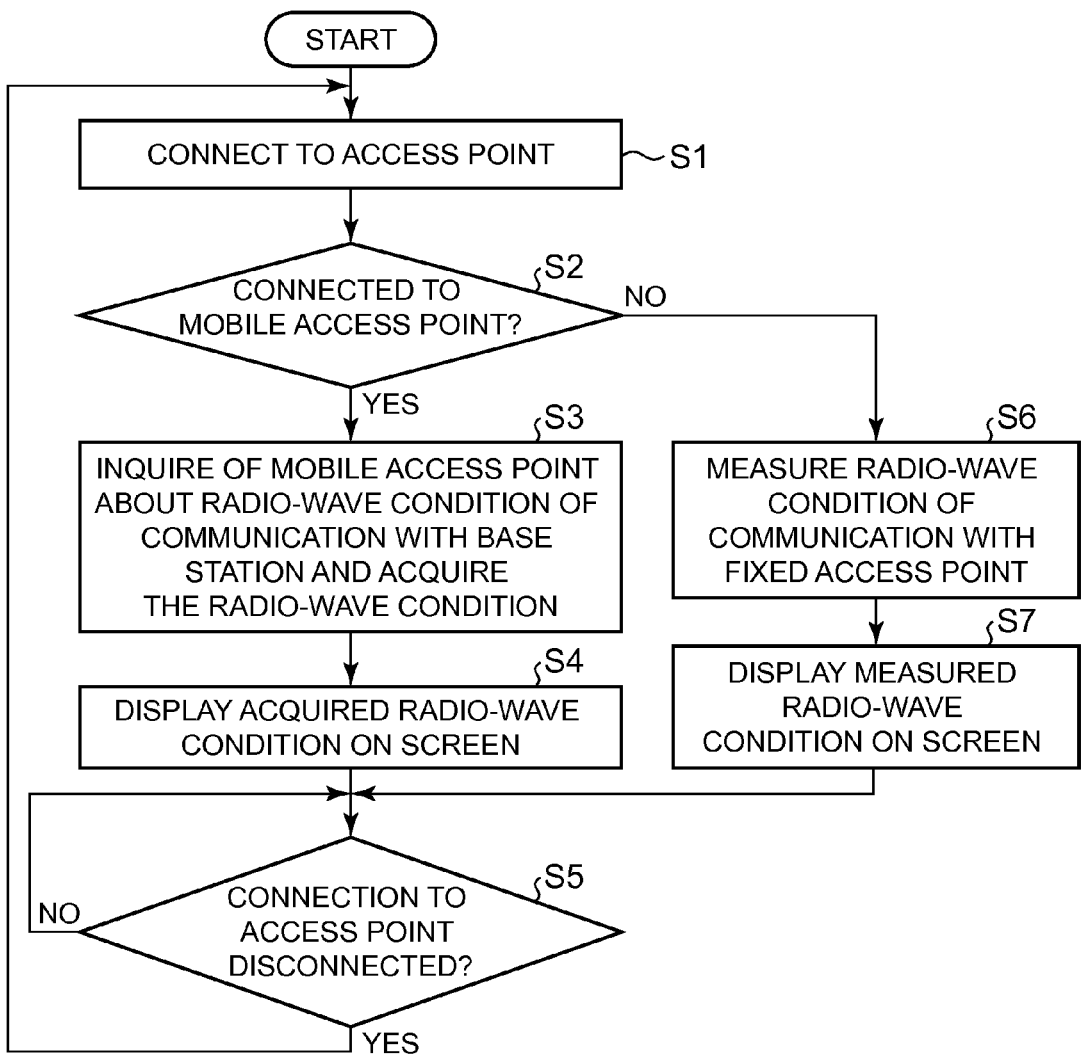
FIG. 3 is a flowchart depicting processing by a wireless terminal apparatus to display a radio-wave condition.
Figure 4:
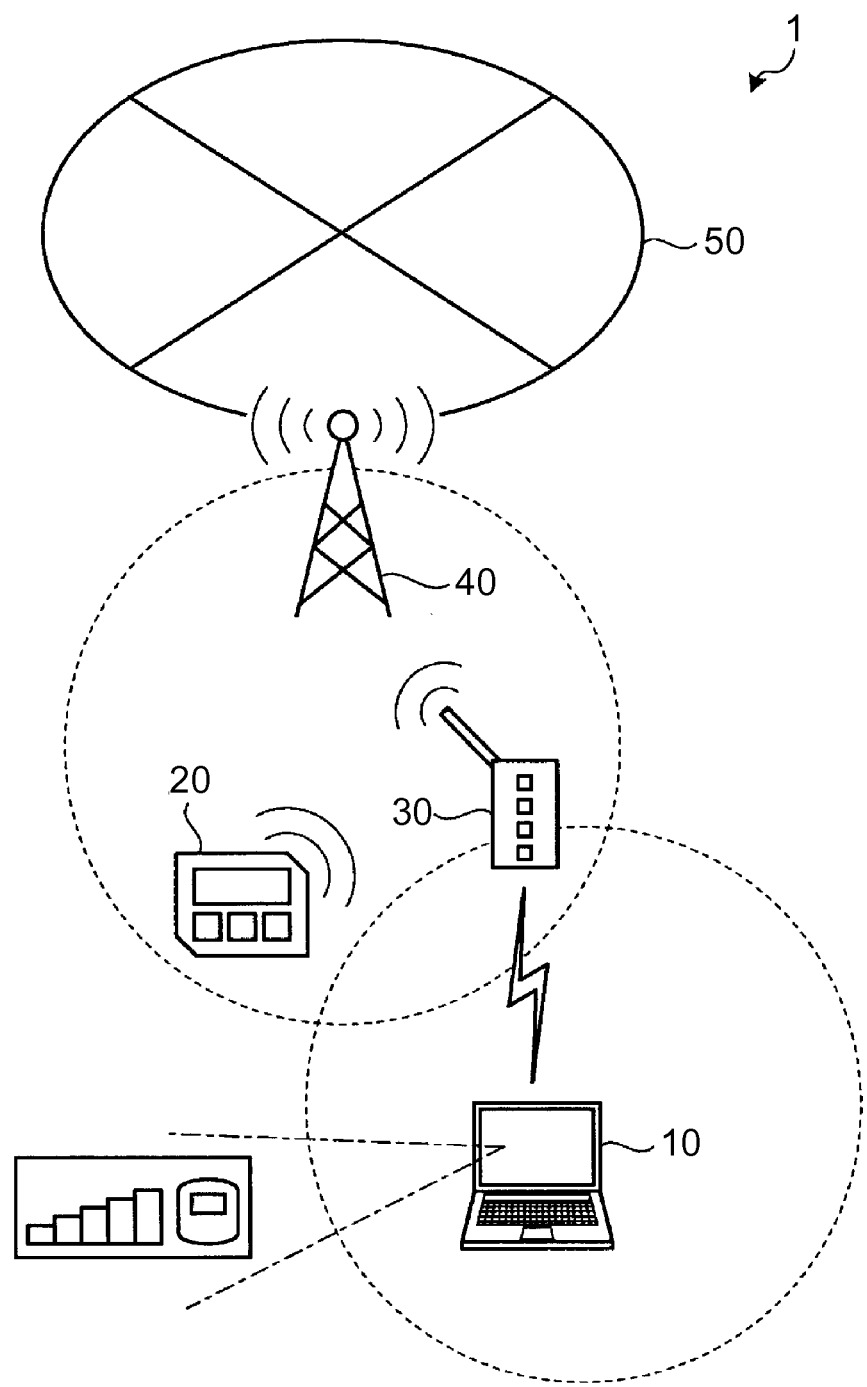
FIG. 4 shows an exemplary display on the screen of a wireless terminal apparatus when the wireless terminal apparatus connects to a fixed access point.
Figure 5:
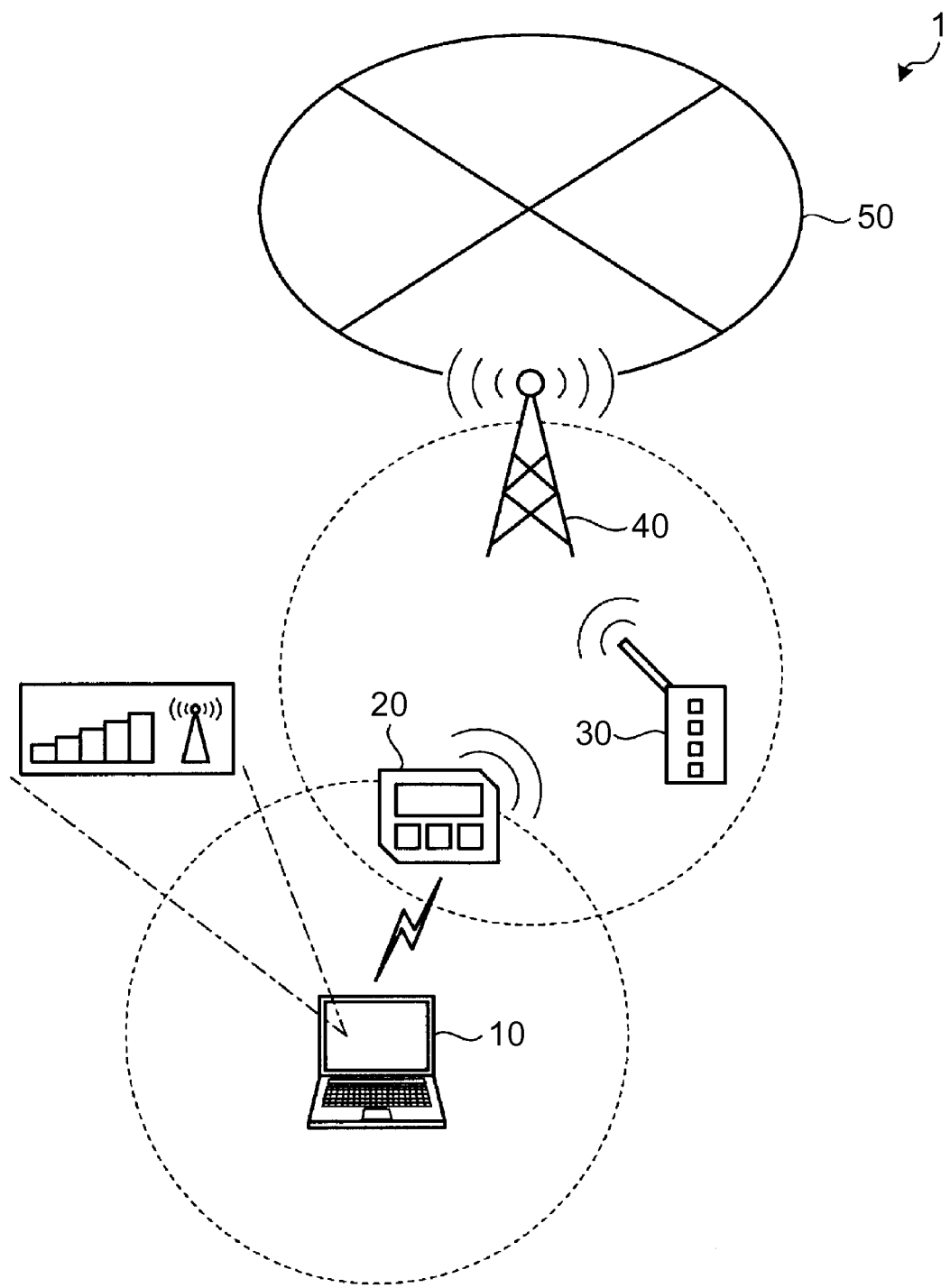
FIG. 5 shows an exemplary display on the screen of a wireless terminal apparatus when the wireless terminal apparatus connects to a mobile access point.

FIG. 3 is a flowchart to describe the processing by the wireless terminal apparatus 10 to display a radio-wave condition. FIG. 4 shows an exemplary display that is displayed on the screen of the wireless terminal apparatus 10 when the wireless terminal apparatus 10 connects to the fixed access point 30. FIG. 5 shows an exemplary display that is displayed on the screen of the wireless terminal apparatus 10 when the wireless terminal apparatus 10 connects to the mobile access point 20. Referring now to FIGS. 4 and 5, the processing by the wireless terminal apparatus 10 of FIG. 2 to display a radio-wave condition is described below in accordance with the flowchart of FIG. 3.

The following description describes the case where the wireless terminal apparatus 10 connects to the mobile access point 20 or the fixed access point 30.

In FIG. 3, the second communication unit 11 of the wireless terminal apparatus 10 firstly connects to an access point (Step S1). The determination unit 14 determines whether the connected access point is the mobile access point 20 or not (Step S2). Specifically, the determination unit 14 may use a known method to determine whether the connected access point is the mobile access point 20 or not based on profile information that is registered beforehand or is newly acquired from the access point, for example.

When the access point is not the mobile access point 20 (No at Step S2), i.e., when the access point is the fixed access point 30, the second measurement unit 12 measures a radio-wave condition of the communication with the fixed access point 30 using the second wireless communication method at predetermined time intervals (Step S6). The display unit 13 displays the measured radio-wave condition on the screen and updates the same at predetermined time intervals (Step S7), and then the procedure shifts to Step S5. For instance, as shown in FIG. 4, when the wireless terminal apparatus 10 is connected to the fixed access point 30, a part of the screen of the wireless terminal apparatus 10 shows a radio-wave condition of the communication of the wireless terminal apparatus 10 with the fixed access point 30 using the second wireless communication method. In the exemplary display of the radio-wave condition in the drawing, the left side shows radio-wave intensity with bars and the right side shows the illustration of the access point. When the radio-wave condition is displayed partially on the screen, it is desirably shown on a lower part of the screen so as not to interfere with other display.

A fixed access point is typically placed at a position having a good radio-wave condition with a base station, and so in the case of a fixed access point, a radio-wave condition between the wireless terminal apparatus 10 and the fixed access point 30 is more important for a user. Therefore, the radio-wave condition between the wireless terminal apparatus 10 and the fixed access point 30 is displayed on the screen of the wireless terminal apparatus 10.

On the other hand, when the access point is the mobile access point 20 (Yes at Step S2), the acquisition unit 15 inquires of the mobile access point 20 about a radio-wave condition of the communication with the base station 40 using the first wireless communication method at predetermined time intervals to acquire this radio-wave condition (Step S3). The display unit 13 displays the acquired radio-wave condition of the communication using the first wireless communication method between the mobile access point 20 and the base station 40 on the screen and updates the same at predetermined time intervals (Step S4), and then the procedure shifts to Step S5. For instance, as shown in FIG. 5, when the wireless terminal apparatus 10 is connected to the mobile access point 20, a part of the screen of the wireless terminal apparatus 10 shows a radio-wave condition of the communication between the mobile access point 20 and the base station 40 using the first wireless communication method. In the exemplary display of the radio-wave condition in the drawing, the right side shows the illustration of a base station.

This allows a user who sees the screen of the wireless terminal apparatus 10 to immediately understand the radio-wave condition between the mobile access point 20 and the base station 40 without checking the mobile access point 20, and when the radio-wave condition is bad, the user can change the position of the mobile access point 20 immediately.

At Step S5, when the connection of the access point is disconnected (Yes at Step S5), the procedure returns to Step S1.

Figure 6:
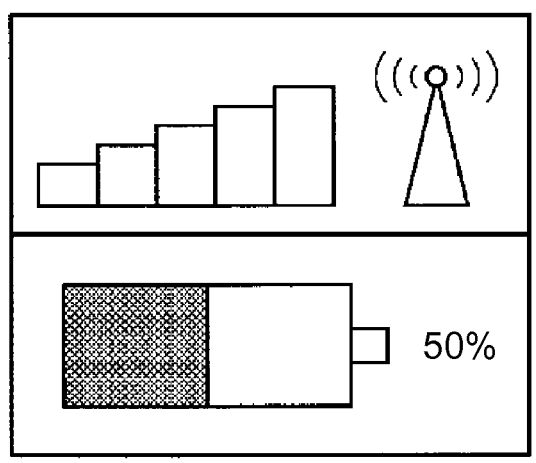
FIG. 6 is another exemplary display on the screen of a wireless terminal apparatus when the wireless terminal apparatus connects to a mobile access point.
Figure 7:
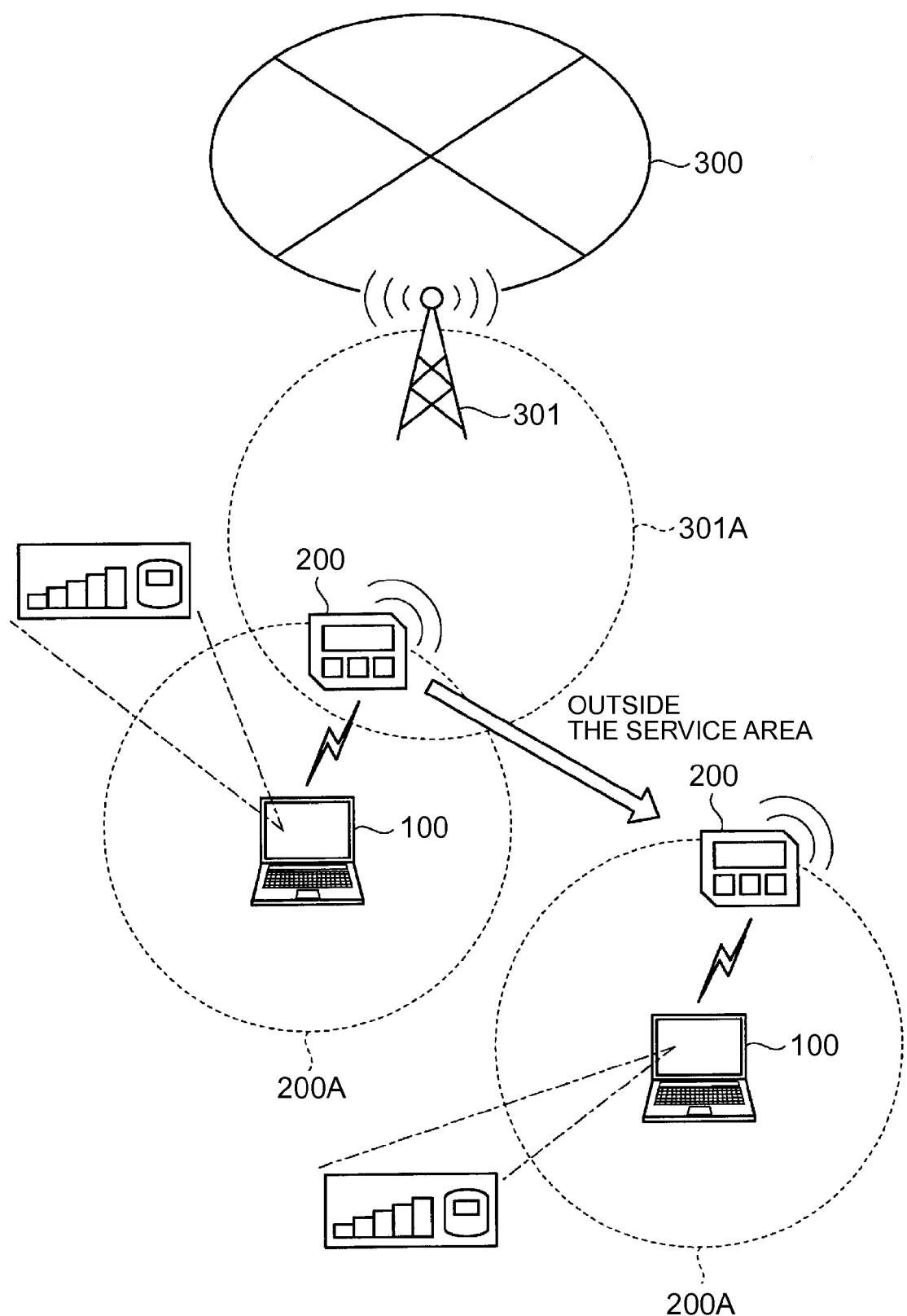
FIG. 7 describes the case where a Wifi terminal connects to a 3G network via a mobile 3G access point that can be an access point of a Wifi terminal.

When the access point is the mobile access point 20, the acquisition unit 15 further may acquire information on battery remaining capacity of the mobile access point 20 from the mobile access point 20 at predetermined time intervals, and the display unit 13 may display the acquired information on battery remaining capacity of the mobile access point 20 on the screen. FIG. 6 is another exemplary display on the screen of the wireless terminal apparatus 10 when the wireless terminal apparatus 10 is connected to the mobile access point 20. As shown in FIG. 6, when the wireless terminal apparatus 10 is connected to the mobile access point 20, a part of the screen of the wireless terminal apparatus 10 may show a radio-wave condition of the communication between the mobile access point 20 and the base station 40 using the first wireless communication method, while showing the information on battery remaining capacity of the mobile access point 20, for example.

As described above, the wireless terminal apparatus 10 of the present embodiment includes the determination unit 14 that determines whether the connected access point is a mobile access point or not, the acquisition unit 15 that acquires, when the determination unit 14 determines that the connection access point is a mobile access point, a radio-wave condition of the communication with the base station using the first wireless communication method from the connected mobile access point, and the display unit 13 that displays the radio-wave condition acquired by the acquisition unit 15 on the screen, and so a user can easily check the radio-wave condition of the mobile access point with the wireless terminal apparatus 10.

The wireless terminal apparatus 10 includes the second measurement unit 12 that measures a radio-wave condition of the communication with the access point using the second wireless communication method, and when the connected access point is not the mobile access point (when it is the fixed access point), the display unit 13 displays the radio-wave condition measured by the second measurement unit 12 on the screen. In this way, a radio-wave condition to be displayed is changed between the mobile access point and the fixed access point, whereby a radio-wave condition that is more important for user can be displayed.

When the access point is the mobile access point, the acquisition unit 15 further acquires information on battery remaining capacity of the mobile access point from the mobile access point, and the display unit 13 displays the acquired information on battery remaining capacity of the mobile access point on the screen. This allows a user who sees the screen of the wireless terminal apparatus 10 to easily check the information on battery remaining capacity of the mobile access point.

What is claimed is:
1. An apparatus comprising:
a wireless terminal,
a determination unit that determines whether a connected access point is a mobile access point or a fixed access point, wherein the connected access point communicates with a base station over a first wireless channel and communicates with the wireless terminal over a second wireless channel;
an acquisition unit that, in response to the connected access point being a mobile access point, acquires a radio-wave condition of the first wireless channel at a first predetermined time interval and acquires information on a remaining battery capacity of the mobile access point at a second predetermined time interval;
a measurement unit that, in response to the connected access point being a fixed access point, measures a radio-wave condition of the second wireless channel; and
a display at the wireless terminal that:
displays an indication of whether the connected access point is a mobile access point or a fixed access point,
displays a radio-wave condition of the first wireless channel and the remaining battery capacity of the mobile access point in response to the connected access point being a mobile access point, and displays a radio-wave condition of the second wireless channel in response to the connected access point being a fixed access point;
wherein said units comprise one or more of a hardware circuit and executable code stored on one or more non-transitory computer readable storage media.
2. The apparatus of claim 1, wherein communicating over the first wireless channel involves a first wireless communication method selected from the group consisting of 3G, 4G/LIE, and WiMAX.

3. The apparatus of claim 1, wherein communication over the second wireless channel involves a second wireless communication method selected from the group consisting of Wifi and Bluetooth®.

4. The apparatus of claim 1, wherein the display displays an icon representing a mobile access point together with the radio wave condition of the first wireless channel in response to the connected access point being a mobile access point, wherein the icon indicates that the connected access point is a mobile access point.

5. The apparatus of claim 1, wherein the display displays an icon representing a base station together with the radio-wave condition of the second wireless channel in response to the connected access point being a fixed access point, wherein the icon indicates that the connected access point is a fixed access point.

6. The apparatus of claim 1, further comprising the mobile access point, the mobile access point communicating with the terminal.

7. A method comprising:
   determining whether a connected access point is a mobile access point or a fixed access point, wherein the connected access point communicates with a base station over a first wireless channel and communicates with the wireless terminal over a second wireless channel;
   displaying an indication of whether the connected access point is a mobile access point or as fixed access point;
   when a determination is made that the connected access point is a mobile access point, acquiring from the connected access point a radio-wave condition of the first wireless channel at a first predetermined time interval and information on a remaining battery capacity at a second predetermined time interval; and displaying the radio-wave condition of the first wireless channel and the remaining battery capacity on a screen; and
   when a determination is made that the connected access point is a fixed access point, measuring a radio-wave condition of the second wireless channel; and displaying a radio-wave condition of the second wireless channel on the screen.

8. The method of claim 7, wherein communicating over the first wireless channel involves a first wireless communication method selected from the group consisting of 3G, 4G/LTE, and WiMAX.

9. The method of claim 7, wherein communicating over the second wireless channel involves a second wireless communication method selected from the group consisting of Wifi and Bluetooth®.

10. The method of claim 7, further comprising displaying an icon representing a mobile access point together with the radio wave condition of the first wireless channel in response to the connected access point being a mobile access point, wherein the icon indicates that the connected access point is a mobile access point.

11. The method of claim 10, further comprising displaying an icon representing a base station together with the radio-wave condition of the second wireless channel in response to the connected access point being a fixed access point wherein the icon indicates that the connected access point is a fixed access point.

12. A program product embodied in a non-transitory computer readable storage medium that stores code executable by a processor to perform:
   determining whether a connected access point is a mobile access point or a fixed access point, wherein the connected access point communicates with a base station over a first wireless channel and communicates with the wireless terminal over a second wireless channel;
   acquiring, in response to the connected access point being a mobile access point, a radio-wave condition of the first wireless channel from the connected access point at a first predetermined time interval and information on a remaining battery capacity at a second predetermined time interval;
   measuring, in response to the connected access point being a fixed access point, a radio-wave condition of the second wireless channel,
   displaying an indication of whether the connected access point is a mobile access point or a fixed access point on a screen;
   displaying the radio-wave condition of the first wireless channel and the remaining battery capacity of the mobile access point on the screen in response to the connected access point being a mobile access point; and
   displaying a radio-wave condition of the second wireless channel on the screen in response to the connected access point being a fixed access point.

13. The program product of claim 12, wherein communicating over the first wireless channel involves a first wireless communication method selected from the group consisting of 3G, 4G/LTE, and WiMAX.

14. The program product of claim 3, wherein communicating over the second wireless channel involves a second wireless communication method selected from the group consisting of Wifi and Bluetooth®.

15. The program product of claim 12, further comprising displaying an icon representing a mobile access point together with the radio wave condition of the first wireless channel in response to the connected access point being a mobile access point, wherein the icon indicates that the connected access point is a mobile access point.

16. The program product of claim 12, further comprising when the determination is made that the connected access point is not a mobile access point, displaying an icon representing a base station together with the radio-wave condition of the second wireless channel in response to the connected access point being a fixed access point, wherein the icon indicates that the connected access point is a fixed access point.

* * * * *